United States Patent [19]

Hart et al.

[11] Patent Number: 5,693,216
[45] Date of Patent: Dec. 2, 1997

[54] METHOD OF AND COMPOSITION FOR BREAKING OIL AND WATER EMULSIONS IN CRUDE OIL PROCESSING OPERATIONS

[75] Inventors: Paul R. Hart, The Woodlands, Tex.; Jen-Chi Chen, Morrisville; Fu Chen, Newtown, both of Pa.; Thai H. Duong, Houston, Tex.

[73] Assignee: BetzDearborn Inc., Trevose, Pa.

[21] Appl. No.: 657,120

[22] Filed: Jun. 3, 1996

[51] Int. Cl.$^6$ ............... C10G 33/04; C02F 1/56; B01D 17/05
[52] U.S. Cl. ............... 208/188; 210/708; 252/328; 252/329; 252/330; 252/331; 252/358
[58] Field of Search .............. 210/708; 252/328–331, 252/358; 208/188

[56] References Cited

U.S. PATENT DOCUMENTS

| 5,176,847 | 1/1993 | Kremer | 252/358 |
| 5,236,951 | 8/1993 | Hart | 210/639 |
| 5,250,174 | 10/1993 | Hart | 208/188 |
| 5,256,304 | 10/1993 | Meyer et al. | 210/708 |
| 5,256,305 | 10/1993 | Hart | 210/708 |
| 5,282,974 | 2/1994 | Hart | 210/639 |
| 5,433,863 | 7/1995 | Braden et al. | 210/708 |

OTHER PUBLICATIONS

Ind.Eng.Chem.Prod.Res.Dev. 1982, "Condensed Tannins for Adhesives", A. Pizzi, 21, 359–369, (month unknown).

*Primary Examiner*—Alan Diamond
*Assistant Examiner*—Cephia D. Toomer
*Attorney, Agent, or Firm*—Alexander D. Ricci; Steven D. Boyd

[57] ABSTRACT

Methods and compositions for breaking oil and water emulsions are disclosed. Oil and water emulsions are broken by treating the emulsion with a copolymer of tannin and a cationic monomer. The preferred composition is an aqueous solution of a copolymer of tannin and a cationic monomer, a water soluble organic multivalent salt and a glycol. The preferred salt is aluminum chlorohydrate and the preferred glycol is hexylene glycol.

17 Claims, No Drawings

METHOD OF AND COMPOSITION FOR BREAKING OIL AND WATER EMULSIONS IN CRUDE OIL PROCESSING OPERATIONS

FIELD OF THE INVENTION

The present invention relates to a process for breaking oil and water emulsions. Specifically, the present invention relates to an improved process for the separation of hydrocarbon liquids emulsified within an aqueous stream.

BACKGROUND OF THE INVENTION

Crude oils recovered from producing wells, especially those from water flooded or steam flooded formations, often are recovered in the form of water-in-oil emulsions. In addition, water-in-oil emulsions may be formed in the processing of crude oil. For example, in oil transport, such as by pipeline or tanker; storage; refining; and cleanup emulsions may form. The fuels such as gasoline, diesel, jet, marine and bunker fuels and other oils, such as those used for lubricants or cosmetics, that are produced from such processing can also form troublesome emulsions when contacted with water.

For example, desalting of crude oil to remove contaminating salts prior to distillation involves the intentional formation of water-in-oil emulsions. Water is added to the crude oil and mixed intimately to transfer impurities from the crude oil to the water phase. Separation of the phases occurs due to coalescence of small water droplets into progressively larger droplets and eventually gravity separation of the oil and water phases occurs.

Demulsification agents are added, usually upstream from the desalter, to help in providing maximum mixing and subsequent separation of the oil and water phases in the desalter. Desalters are also commonly provided with electrodes to impart an alternating electrical field in the desalter. This serves to polarize the droplets by orienting the dipolar water molecules. The so formed dipole droplets exert an attractive force between oppositely charged poles with the increased attractive force increasing the speed of water droplet coalescence. The water droplets also vibrate quickly in the alternating electrical field, thus destabilizing intervening films. This further enhances coalescence.

Upon separation of the phases from the water-in-oil emulsion, the crude is commonly drawn off of the top of the desalter and sent to the fractionater tower or other refinery processes. The water phase, containing water soluble salt compounds and dispersed, insoluble sediment is discharged as effluent.

Emulsion breakers, also called demulsifiers, are usually fed to the crude so as to modify the stabilizer film formed at the oil/water interface. These emulsion breakers are surfactants that migrate to the interface allowing droplets of water to coalesce more readily. The demulsifiers reduce the residence time required for good separation of oil and water.

The use of condensed type tannins to break emulsions is disclosed in U.S. Pat. No. 5,433,863. The method of clarifying waste-water from a petroleum production field and recovering emulsified oil described in U.S. Pat. No. 5,433, 863 involves the use of condensed type tannin materials optionally in combination with an inorganic coagulant and optionally a polymeric flocculant. The preferred method disclosed therein involves treatment of an oil-in-water emulsion with an aqueous de-emulsifying agent (a tannin) which preferably includes an inorganic coagulant (such as salts of iron, aluminum, copper and the like). The aqueous de-emulsifying agent also preferably includes a synthetic or natural flocculant such as a high molecular weight anionic or cationic, neutralized or quaternized amine, acrylamide, acrylic acid, acrylate, acrylate salts or combinations thereof.

SUMMARY OF THE INVENTION

The present inventors discovered that effective water and oil emulsion breaking could be provided by a copolymer of tannin and a cationic monomer. Optionally a water soluble aluminum salt such as aluminum chlorohydrate may be employed with the copolymer in the method of the present invention.

DETAILED DESCRIPTION OF THE INVENTION

The present invention relates to methods for resolving or breaking oil and water emulsions comprising adding to an aqueous stream having oil therein an effective amount of an aqueous solution of a copolymer of tannin and a cationic monomer. Optionally, water soluble salts of aluminum, calcium, iron, magnesium, zirconium, or other multivalent cations may be included. The aqueous solution may be supplied as a concentrate for economy in shipping and packaging. When a solution of the copolymer and multivalent salt is provided in concentrated form, a precipitation inhibitor such as a glycol is desirable.

The present aqueous emulsion breaker comprises a water soluble copolymer of tannin and a cationic monomer. Tannins comprise astringent, aromatic acidic glucoside compounds found in various plants and trees. Tannin precipitates alkaloids, mercuric chloride and heavy metal, forms blue-black ink with ferric solutions; and in strongly alkaline solutions rapidly absorbs oxygen. Tannin is classified according to its dry distillation products into two groups: condensed tannin, which yields catechol and hydrolyzable tannin which yields pyrogallol. Condensed type tannin has a high activity in the present invention at relatively low concentrations.

Tannin, also called tannic acid, occurs in the leaf, branch, bark and fruit of many plants. As disclosed by A. Pizzi in "Condensed Tannin for Adhesives", Ind. Eng. Chem. Prod. Res. Dev. 1982, 21, pages 359–369, the natural tannins can be as "hydrolyzable" tannin and "condensed" tannin. The composition and structure of tannin will vary with the source and the method of extraction, but the empirical structure is given as $C_{76}H_{52}O_{46}$ with many OH groups attached to the aromatic rings. The tannin used in the present invention is a condensed tannin type including but not limited to those derived from Quebracho, Mimosa and Sumac. However, hydrolyzable tannins are also contemplated to be within the scope of this invention.

The present invention relates to methods for resolving or breaking oil and water emulsions comprising adding a water soluble or dispersible tannin containing polymer composition comprising a copolymer of a tannin and a cationic monomer to an aqueous stream which has or will have oil therein. In another embodiment of the present invention, the water soluble or dispersible tannin containing polymer composition comprises a polymer of tannin, a cationic monomer and at least one monomer selected from the group consisting of an anionic monomer and a nonionic monomer.

The cationic monomer is selected from a group containing ethylenically unsaturated quaternary ammonium, phosphonium or sulfonium ions. Typical cationic monomers are diallyl dialkyl ammonium chloride and quaternary ammonium salts of dialkylaminoalkyl(meth)acrylamides, and dialkylaminoalkyl(meth)acrylates The preferred cationic monomers include but are not limited to diallyldimethyl ammonium chloride and diallyldiethyl ammonium chloride, methyl chloride or dimethyl sulfate quaternary salt of diethylaminoethyl acrylate, dimethylaminoethyl acrylate, dimethylaminoethyl methacrylate, diethylaminoethyl methacrylate, dimethylaminopropyl methacrylamide, or dimethylaminopropyl acrylamide. The most preferred cationic monomer is methyl chloride quaternary salt of dimethylaminoethyl acrylate.

The anionic monomer is selected from the group containing ethylenically unsaturated carboxylic acid or sulfonic acid functional groups. These monomers include but are not limited to acrylic acid, methacrylic acid, vinyl acetic acid, itaconic acid, maleic acid, allylacetic acid, styrene sulfonic acid, 2-acrylamido-2-methyl propane sulfonic acid (AMPS®) and 3-allyloxy-2-hydroxypropane sulfonic acids and salts thereof. The preferred anionic monomer is acrylic acid.

The nonionic monomer is selected from the group of ethylenically unsaturated nonionic monomers which comprise but are not limited to acrylamide, methacrylamide, N-methylolacrylamide, N,N-dimethylacryl-amide; lower alkyl ($C_1$-$C_6$) esters including vinyl acetate, methyl acrylate, ethyl acrylate, and methyl methacrylate; hydroxylated lower alkyl ($C_1$-$C_6$) esters of acrylic and methacrylic acid including hydroxyethyl acrylate, hydroxypropyl acrylate and hydroxyethyl methacrylate; allyl glycidyl ether; ethoxylated allyl ethers of polyethylene glycol, and polypropylene glycol; and ethoxylated propoxylated acrylates. The preferred nonionic monomers are allyl glycidyl ether and acrylamide.

The resulting tannin containing polymer contains from 10 to 80% by weight of tannin, 20 to 90% by weight of cationic monomer, 0 to 30% by weight of nonionic monomer and 0 to 20% by weight of anionic monomer, provided that the resulting tannin containing polymer is still water soluble or dispersible and the total weight % of cationic, nonionic and anionic monomers and tannin adds up to 100%. Preferably, when the cationic monomer and anionic monomer are present together in the tannin containing polymer, the cationic monomer comprises a greater mole percentage than the anionic monomer.

The preferred copolymer of tannin and cationic monomer contains 20 to 80 weight % of tannin. More preferably, the copolymer contains from 30 to 60 weight % of tannin and most preferably, from 30 to 50 weight % of tannin in the copolymer, provided the total weight of tannin and cationic monomer totals 100 weight %. More preferably still, the copolymers have a weight % of 30% tannin and 70% cationic monomer and 50% tannin and 50% cationic monomer. These particular copolymers are most preferred when the tannin is a Mimosa type tannin and the cationic monomer is methyl chloride quaternary salt of dimethylaminoethyl acrylate.

The number average molecular weight of the resulting tannin containing polymer is not critical, as long as it is still water soluble or dispersible. The tannin containing polymers may be prepared by mixing the desired monomers with tannin and initiating by a free radical initiator via solution, precipitation or emulsion polymerization techniques. Conventional initiators such as azo compounds, persulfates, peroxides and redox couples may be used. The preferred initiators are 2,2'azobis(2-amidinopropane) dihydrochloride, available as V-50 from Wako Chemicals and t-butylhydroperoxide/sodium metabisulfite (t-BHP/NaMBS). These or other initiators may be added at the end of polymerization to further react with any residual monomers.

Chain transfer agents such as alcohol, amine, formic acid or mercapto compounds may be used to regulate the molecular weight of the polymer. The resulting polymer may be isolated by well known techniques including precipitation, etc., or the polymer may simply be used in its aqueous solution.

The reaction temperature is not critical and generally occurs between 20° and 100° C., preferably 40° to 70° C. The pH of the reaction mixture is also not critical and is generally in the range of 2.0 to 8.0. The resulting tannin containing polymers are characterized by C-13 NMR, Brookfield viscosity and percent solids. The procedure for preparing the inventive copolymers may be found in pending application 08/246,547, the contents of which are wholly incorporated by reference herein.

The copolymers of the present invention can be added to an oil-in-water emulsion or an aqueous stream prior to emulsification with oil. For purposes of the present invention, the term "effective amount for the purpose" is defined as that amount of copolymer which will accelerate the breaking of the emulsion being treated or made. For example, aqueous solutions of the copolymer are added so as to provide from 7.5 to 30 parts per million active treatment in an oil-in-water emulsion being broken.

The copolymer in an aqueous solution at a concentration of from 1 to 50% by weight is preferably added in combination with a multivalent organic salt such as salts of aluminum, iron, zinc and zirconium. Preferred multivalent inorganic salts are water soluble aluminum salts such as aluminum chlorohydrate. Such salts may be fed as separate aqueous solutions at concentrations of from about 1% to 50% by weight. The ratio of copolymer to salt can range from about 1:10 to about 10: 1. When the copolymer/salt blend is supplied as a single drum blend it is preferred that a glycol be added to inhibit precipitation. At the concentrations of the present invention the copolymers and these salts will coprecipitate on contact.

The addition of a glycol, such as hexyleneglycol was found to inhibit precipitation of such blends. The amount of glycol needed will vary with the concentration of the copolymer and salt. The amount of glycol added to inhibit precipitation problems will be proportional to the concentrations of the copolymer and salt and typically ranges from about 1 to 30% by weight of the blend.

EXAMPLES

The following examples are intended to show the efficacy of the present invention as an emulsion breaker. They are not intended to limit the scope of the invention to the specific test conditions.

Representative emulsion breakers within the scope of the present invention were added to a reverse emulsion (an oil-in-water emulsion) sampled without shear from a refinery desalter. The treated emulsion was mixed at a temperature and with a shear and duration approximating that of a desalter mix valve. The sample was then allowed to settle at a temperature and electric field strength and for a residence time approximating that of the desalter the sample was taken from. In addition, in some cases the reverse of the desalter systems influent oil/water ratio was tested (to simulate a small portion of the oil emulsified into the more turbulently flowing water at or before the mix valve). The emulsion breakers of the present invention were added to the influent wash water, which was then mixed with the influent raw crude oil, and allowed to settle as described above. The clarity of the water phase was observed after mixing or remixing at 4000 rpm for 1 second at predetermined times and rated according to the following scale: 1=clear, 2=almost clear, 3=white translucent, 4=medium translucent, 5=barely translucent, 6=opaque. The oily effluent tested was initially rated a 6.

The effect of the emulsion breakers of the present invention at accelerating the breaking of water-in-oil emulsions was also evaluated. The testing was performed at a ratio of oil to water comparable to the through-put ratio of oil to water for the desalter system being simulated. In these tests, a conventional breaker for obverse (water-in-oil) emulsions, an alkylphenol-formaldehyde resin alkoxylate, was present. The emulsion breakers of the present invention were added to influent wash water, and the alkylphenolformaldehyde resin alkoxylate was added to the influent raw crude oil. The two phases were then mixed and settled as described above. The volume of water which dropped to the bottom of the test tube ("water drop") was measured at a predetermined series of time intervals and an average calculated.

Table I summarizes the copolymer and copolymer/salt formulations tested. Tables II through V summarize the test results of the oil-in-water emulsion testing. The treatments were added to the aqueous test fluid at 200° F., spun, heated for 30 minutes to the temperature indicated and spun again. Clarity was rated after 0, 15 and 30 minutes. Table VI summarizes the results of testing water-in-oil emulsions, measuring water drop as described above.

TABLE I

| Treatment | Copolymer* | Monomer Ratio | Aluminum Salt | Copolymer/ Salt Ratio |
|---|---|---|---|---|
| A (5018) | tannin:AETAC | 50:50 | Al$_2$Cl(OH)$_5$ | 3:4 |
| B (2030) | tannin:AETAC | 50:50 | — | — |
| C (2206) | tannin:AETAC | 30:70 | — | — |

*AETAC = acryloxyethyltrimethylammonium chloride

TABLE II

Crude Oil A: Clarity Rating
Oily Effluent Brine with 5% Oil

| Treatment | ppm active | 200°–300° F. 0 min | 30 min | 300° F. 0 min | 15 min | 30 min |
|---|---|---|---|---|---|---|
| Blank | 0 | 6 | 6 | 6 | 6 | 6 |
| A | 15 | 4 | 1 | 1 | 1 | 1 |
| A | 7.5 | 4 | 2 | 2 | 2 | 2 |
| B | 15 | 4 | 2 | 3 | 2 | 2 |
| B | 7.5 | 4 | 2 | 2 | 2 | 2 |
| C | 15 | 4 | 4 | 4 | 3 | 3 |

TABLE III

Crude Oil A: Clarity Rating
Reverse Ratio with 7% Oil

| Treatment | ppm active | 200°–300° F. 0 min | 30 min | 300° F. 0 min | 15 min | 30 min |
|---|---|---|---|---|---|---|
| Blank | 0 | 6 | 6 | 6 | 6 | 6 |
| A | 15 | 4 | 1 | 2 | 1 | 1 |
| B | 15 | 6 | 1 | 6 | 4 | 2 |

TABLE IV

Crude Oil B: Clarity Rating at 30 Minutes
Oily Effluent Brine with 4% Oil

| Treatment | ppm active | Fresh Sample 290° F. | 18 Day Old Sample - 290° F. |
|---|---|---|---|
| Blank | 0 | 6 | 5 |
| A | 15 | 1 | 2 |
| A | 30 | 2 | — |
| B | 15 | 2 | 2 |
| B | 30 | 1 | — |

TABLE V

Clarity Rating at 30 Minutes
Reverse Ratio

| Treatment | ppm active | 9% Crude C 290° F. | 5% Crude D 285° F. |
|---|---|---|---|
| Blank | 0 | 6 | 6 |
| A | 15 | 2 | 1 |
| B | 15 | 1 | 1.5 |

TABLE VI

| Crude | Treatment | ppm active[1] | Water Drop in mL Time(min.) | | | | | | | Mean |
|---|---|---|---|---|---|---|---|---|---|---|
| | | | 1 | 2 | 4 | 8 | 16 | 32 | 64 | |
| C[4] | B[2] | 15 | 0.6 | 2.7 | 6.2 | 7.7 | 9.0 | 9.5 | 9.7 | 6.49 |
| C[4] | —[2] | 0 | 0.6 | 2.7 | 6.2 | 7.7 | 9.2 | 9.5 | 9.8 | 6.53 |
| E[5] | B[3] | 15 | 2.0 | 3.5 | 4.0 | 4.2 | 4.5 | 5.0 | 5.0 | 4.03 |
| E[5] | —[3] | 0 | 1.6 | 3.0 | 3.2 | 3.7 | 4.2 | 4.5 | 4.7 | 3.56 |

[1]Based upon water
[2]Alkylphenol-formaldehyde resin alkoxylate added to oil at 6 ppm active based on oil
[3]Alkylphenol-formaldehyde resin alkoxylate added to oil at 4.8 ppm active based on oil
[4]9% water mixed with oil
[5]5% water mixed with oil The data in Tables II through VI shows that the copolymers of the present invention are effective breakers of oil and water emulsions as would be experienced in the processing of crude oils.

While this invention has been described with respect to particular embodiments thereof, it is apparent that numerous other forms and modifications will be obvious from this disclosure to those skilled in the art. The appended claims and this invention generally should be construed to cover all such obvious forms and modifications which are within the true spirit and scope of the present invention.

What is claimed is:

1. A method of breaking oil and water emulsions in an oil processing system comprising adding to said system an effective amount for the purpose of breaking said emulsions of an aqueous solution of a copolymer of a tannin and methyl chloride quaternary salt of dimethylaminoethyl acrylate.

2. The method as claimed in claim 1 wherein said tannin is a condensed tannin.

3. The method as claimed in claim 2 wherein said tannin is selected from the group consisting of Quebracho and Mimosa.

4. The method as claimed in claim 1 wherein said copolymer contains about 10 to about 80 weight percent tannin and about 90 to about 20 weight percent methyl chloride quaternary salt of dimethylaminoethyl acrylate.

5. The method as claimed in claim 1 wherein the weight percent of said tannin in said polymer is about 30 percent and the weight percent of said methyl chloride quaternary salt of dimethylaminoethyl acrylate in said copolymer is about 70 percent.

6. The method as claimed in claim 1 wherein the weight percent of said tannin in said copolymer is about 50 percent and the weight percent of said methyl chloride quaternary salt of dimethylaminoethyl acrylate in said copolymer is about 50 percent.

7. The method as claimed in claim 1 wherein said copolymer further comprises a monomer selected from the group consisting of a nonionic monomer and an anionic monomer.

8. The method as claimed in claim 7 wherein said nonionic monomer is selected from the group consisting of acrylamide, methacrylamide, N-methylolacrylamide, N,N-dimethylacrylamide, vinyl acetate, methyl acrylate, ethyl acrylate, methyl methacrylate, hydroxyethyl acrylate, hydroxypropyl acrylate, hydroxyethyl methacrylate, allyl glycidyl ether, ethoxylated allyl ether of polyethylene glycol, and ethoxylated allyl ether of polypropylene glycol.

9. The method as claimed in claim 7 wherein said anionic monomer is selected from the group consisting of acrylic acid, methacrylic acid, vinyl acetic acid, itaconic acid, maleic acid, allylacetic acid, styrene sulfonic acid, 2-acrylamido-2-methyl propane sulfonic acid, and 3-allyloxy-2-hydroxypropane sulfonic acid.

10. The method as claimed in claim 1 further comprising adding to said system an aqueous multivalent inorganic salt.

11. The method as claimed in claim 10 wherein said multivalent inorganic salt is a water soluble aluminum salt.

12. The method as claimed in claim 11 wherein said water soluble aluminum salt is aluminum chlorohydrate.

13. A method of breaking oil and water emulsions in an oil processing system comprising adding to said system an effective amount for the purpose of breaking said emulsions of an aqueous solution of a copolymer of a tannin, a cationic monomer, an anionic monomer and a nonionic monomer selected from the group consisting of acrylamide, methacrylamide, N-methylolacrylamide, N,N-dimethylacrylamide, vinyl acetate, methyl acrylate, ethyl acrylate, methyl methacrylate, hydroxyethyl acrylate, hydroxypropyl acrylate, hydroxyethyl methacrylate, allyl glycidyl ether, ethoxylated allyl ether of polyethylene glycol, and ethoxylated allyl ether of polypropylene glycol.

14. The method as claimed in claim 13 wherein said cationic monomer is selected from the group consisting of diallyl dimethyl ammonium chloride, diallyl diethyl ammonium chloride, methyl chloride quaternary salt or dimethyl sulfate quaternary salt of diethylaminoethyl acrylate, dimethylaminoethyl acrylate, dimethylaminoethyl methacrylate, diethylaminoethyl methacrylate, dimethylaminopropyl methacrylamide and dimethylaminopropyl acrylamide.

15. A method of breaking oil and water emulsions in an oil processing system comprising adding to said system an effective amount for the purpose of breaking said emulsions of an aqueous solution of a copolymer of a tannin, a cationic monomer, a nonionic monomer, and an anionic monomer selected from the group consisting of acrylic acid, methacrylic acid, vinyl acetic acid, itaconic acid, maleic acid, allylacetic acid, styrene sulfonic acid, 2-acrylamido-2-methyl propane sulfonic acid, and 3-allyloxy 2-hydroxypropane sulfonic acid.

16. A method of breaking oil and water emulsions in an oil processing system comprising adding to said system an effective amount for the purpose of breaking said emulsion of an aqueous solution of a copolymer of a tannin and a cationic monomer in combination with aluminum chlorohydrate.

17. A method of breaking oil and water emulsions in an oil processing system comprising adding to said system an effective amount for the purpose of breaking said emulsion of an aqueous solution of a copolymer of a tannin and methyl chloride quaternary salt of dimethylaminoethyl acrylate in combination with a nonionic monomer selected from the group consisting of acrylamide, methacrylamide, N-methylolacrylamide, N,N-dimethylacrylamide, vinyl acetate, methyl acrylate, ethyl acrylate, methyl methacrylate, hydroxyethyl acrylate, hydroxypropyl acrylate, hydroxyethyl methacrylate, allyl glycidyl ether, ethoxylated allyl ether of polyethylene glycol, and ethoxylated allyl ether of polypropylene glycol and an anionic monomer selected from the group consisting of acrylic acid, methacrylic acid, vinyl acetic acid, itaconic acid, maleic acid, allylacetic acid, styrene sulfonic acid, 2-acrylamido-2-methyl propane sulfonic acid, and 3-allyloxy 2-hydroxypropane sulfonic acid and aluminum chlorohydrate.

\* \* \* \* \*